United States Patent [19]

Fuller

[11] 4,419,895
[45] Dec. 13, 1983

[54] CANTILEVERED-BEAM, FIBER-OPTIC ANGULAR ACCELEROMETER

[75] Inventor: Harrison W. Fuller, Nashua, N.H.

[73] Assignee: Sanders Associates, Inc., Nashua, N.H.

[21] Appl. No.: 342,254

[22] Filed: Jan. 25, 1982

[51] Int. Cl.³ .............................................. G01P 15/08
[52] U.S. Cl. .................................... 73/517 A; 250/227
[58] Field of Search ............. 73/517 R, 517 A, 516 R; 250/227

[56] References Cited

U.S. PATENT DOCUMENTS

| 3,146,057 | 8/1964 | Rona ................................. 73/517 R |
| 3,224,279 | 12/1965 | Galli et al. ........................ 73/517 R |
| 4,368,430 | 1/1983 | Dale et al. ............................ 250/227 |

*Primary Examiner*—James J. Gill
*Attorney, Agent, or Firm*—Louis Etlinger; Richard I. Seligman

[57] ABSTRACT

An angular accelerometer comprising a pair of misaligned, spaced apart, cantilevered optical fibers whereby angular accelerations occasion modulation of an optical signal coupled between the two spaced apart, cantilevered-beam optical fibers.

8 Claims, 3 Drawing Figures

CANTILEVERED-BEAM, FIBER-OPTIC ANGULAR ACCELEROMETER

BACKGROUND OF THE INVENTION

This invention relates to angular accelerometers and more particularly to fiber optic angular accelerometers.

There are many requirements for angular accelerometers. Presently, these requirements are generally filled by rate gyroscopes, angular differentiating accelerometers, magnetohydrodynamic angular rate sensors, etc. These devices, while operating adequately for many applications, have disadvantages in that they are limited in sensitivity, environmental hardness and bulkiness.

Accordingly, it is an object of this invention to provide an improved angular accelerometer.

It is another object of this invention to provide an angular accelerometer using optical fibers.

SUMMARY OF THE INVENTION

Briefly, in one embodiment an inexpensive, relatively simple, small, lightweight, sensitive angular accelerometer is achieved by providing a pair of spaced apart optical fibers each of which forms a cantilevered beam. The optical fibers are offset or misaligned from axial alignment to provide high sensitivity to angular accelerations about an axis perpendicular to the fiber axes and perpendicular to the direction of offset. Mass-loading members are arranged on each of the optical fibers to tailor the frequency response of the accelerometer and to minimize response to linear accelerations.

When the accelerometer undergoes angular acceleration in the desired direction, light coupling between the two cantilevered-beam optical fibers will vary proportionally.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
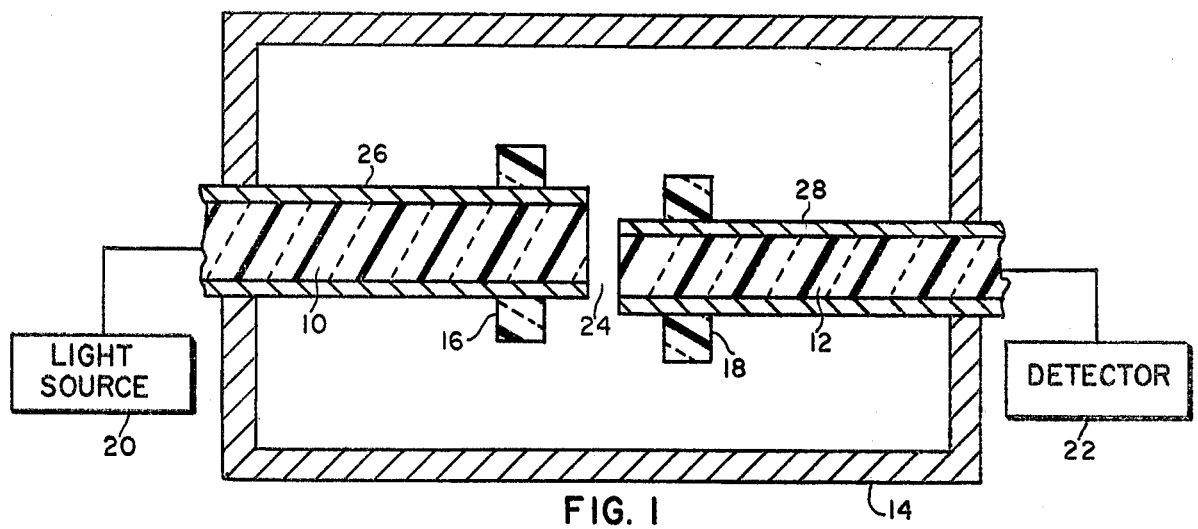
FIG. 1 is a partial cross-sectional view of a cantilevered-beam, fiber-optic angular accelerometer.

Referring now to FIG. 1 of the drawings, there is illustrated thereby an embodiment of a cantilevered-beam, fiber-optic angular accelerometer according to the principles of the invention. The principal components of the cantilevered-beam, fiber-optic angular accelerometer include first and second optical fibers 10, 12 mounted within a housing 14 so as to provide first and second cantilevered beams. A pair of mass-loading members 16 and 18 is provided on the optical fibers 10 and 12, respectively, so as to mass load them to provide balanced moments of inertia for each cantilevered-beam and desirable frequency response characteristics.

Light is applied to one of the cantilevered-beam optical fibers, for example, optical fiber 10, from a light source 20. While the term "light" is used throughout this specification it is to be understood that the term includes both the visible and invisible and includes all wavelengths which can be transmitted by the optical fibers. Coupled to the other cantilevered-beam optical fiber 12 is a detector 22 to measure the amount of light transferred beween the optical fiber 10 and the optical fiber 12. Light entering the optical fiber 10 from light source 20 is coupled across a gap 24 to the optical fiber 12.

The fibers 10, 12 are offset as shown in FIG. 1 in order to promote sensitivity only in the desired direction and to achieve linear response. The reason for this offset can be seen in the graph of FIG. 2 which shows light power coupled between fibers as a function of lateral displacement. This graph shows that the response to angular accelerations in the desired direction is substantially linear while at the same time insensitive to accelerations at right angles to the desired direction.

Figure 2:
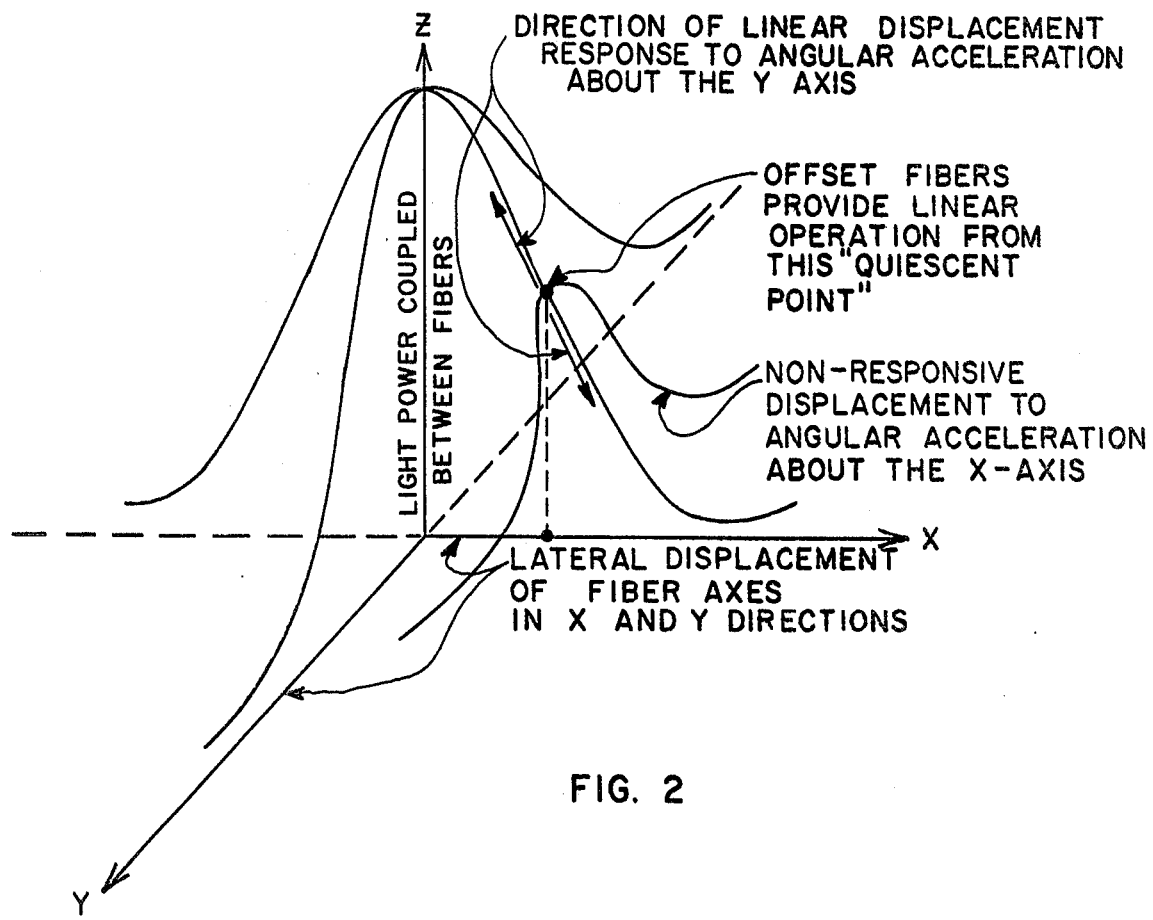
FIG. 2 is a graph illustrating how the sensitivity of the accelerometer of FIG. 1 is maximized, made linear, and made insensitive to accelerations other than those in the desired direction by providing specific misalignment between the optical fibers.

Referring again to FIG. 1, it should be noted that the device will only be sensitive to angular accelerations about an axis perpendicular to the fiber axes and perpendicular to the direction of offset, i.e. an axis normal to the paper. In FIG. 2 this corresponds to angular accelerations in the XZ plane about the Y-axis. Rotation about the other two axes will be non-responsive in terms of intensity modulation of the optical signal passing through the device. The angular sensitivity of the device will be on the order $\Delta\theta = 10^{-10}$ radians.

Figure 3:
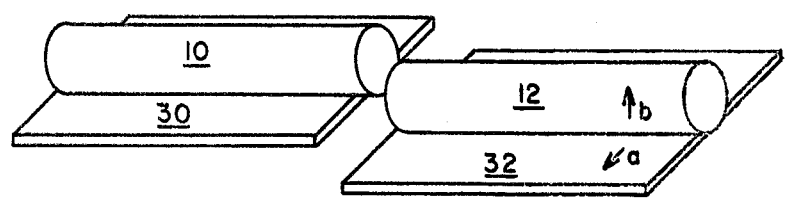
FIG. 3 is a perspective view of a cantilevered-beam, fiber optic angular accelerometer having additional stiffening strips.

In certain applications the optical fibers 10, 12 may not be sufficiently stiff and may bend excessively. To alleviate this problem the fibers 10, 12 may be disposed within sleeves to provide stiffening, such as metal sleeves 26, 28. The stiffening members 26, 28 also reduce deflections in the direction perpendicular to the direction of offset of the fibers. Alternatively, stiffening may be provided by affixing flat strips 30, 32 to the fibers 10, 12 as shown in FIG. 3. This desensitizes deflection in the "a" direction without much influence in the "b" direction.

The response to linear accelerations is made small by matching the deflection versus linear acceleration of the two fiber beams. This may require a trimming adjustment of the mass-loading members 16, 18 to minimize response to linear acceleration. It is necessary to match the moment of inertia (mass x moment arm) of each mass-loaded optical fiber so that, below resonance at least, both mass-loaded fibers will respond to linear acceleration with equal deflection. If the response to linear acceleration is one of equal deflections of both cantilevered-beams no change in light coupling occurs. There is a limitation to how large the linear acceleration can be, since with large linear acceleration the beams at their ends will no longer be colinear, and some decrease in coupling will ultimately occur. It is anticipated that in most applications, however, the angular acceleration being sought is very small, and would probably not be associated with linear accelerations large enough to produce this linear acceleration sensitivity. The sensitivity to angular acceleration, as opposed to linear acceleration, occurs since for angular accelerations the two mass-loaded beam ends are caused to move in opposite directions, so producing a modulation of the coupled light intensity proportional to the component of angular acceleration along the sensitive direction previously described.

The mass-loading members 16, 18 can be adjusted in position on the two fibers to allow a trade-off between sensitivity and resonant frequency of the beam members to best satisfy particular applications. With the mass-loading position close to the supported end of the cantilever beam the resonant frequency is increased, and the outer end of the beam mechanically amplifies the motion experienced by the mass loading member by remaining straight and translating through a greater distance than the mass load itself.

In certain instances it may be desired to fill the housing 14 with, for example, oil for damping purposes. Damping may also be provided to, for example, flatten the frequency response of the sensor, by applying a coating of a flexible damping plastic material around the fibers 10, 12.

The gap 24 is preferably made as small as possible to maximize coupling between the optical fibers 10, 12. However, the fibers 10, 12 are maintained far enough apart so that they will not touch during thermal expansion which might take place. Preferably the ends of the optical fibers are tapered to increase sensitivity.

While I have described above the principles of my invention in connection with specific apparatus, it is to be clearly understood that this description is made only by way of example and not as a limitation of the scope of my invention as set forth in the accompanying claims.

I claim:

1. An angular accelerometer, comprising:
   a first optical fiber arranged as a cantilevered-beam;
   a second optical fiber arranged as a cantilevered-beam spaced and offset from such first optical fiber such that optical coupling between said first and second optical fibers varies proportionately to angular accelerations about an axis perpendicular to the fiber axes and perpendicular to the direction of offset; and
   means for mass loading each of said first and second optical fibers with a mass loading member which is non-responsive to magnetic fields.

2. An angular accelerometer as defined in claim 1, further including means for applying light to said first optical fiber and means for detecting light from said second optical fiber.

3. An angular accelerometer as defined in claim 1, further including a housing for containing said first and second optical fibers.

4. An angular accelerometer as defined in claim 3, wherein said housing contains a damping fluid.

5. An angular accelerometer as defined in claim 1, wherein said optical fibers have a coating thereon to provide damping.

6. An angular accelerometer as defined in claim 1, further including means for stiffening said first and second optical fibers.

7. An angular accelerometer as defined in claim 6, wherein said stiffening means includes sleeves disposed about said first and second optical fibers.

8. An angular accelerometer as defined in claim 6, wherein said stiffening means includes flat strips affixed to said first and second optical fibers.

* * * * *